UNITED STATES PATENT OFFICE 2,337,473

SULPHURIZATION OF HYDROCARBONS

Edwin C. Knowles and Frederic C. McCoy, Beacon, N. Y., assignors, by mesne assignments, to The Texas Company, New York, N. Y., a corporation of Delaware No Drawing. Application September 28, 1940, Serial No. 358,878

3 Claims. (Cl. 260—139)

This invention relates to a process for the production of sulphurized products from liquid petroleum hydrocarbon mixtures containing unsaturated compounds. It also relates to the sulphurized products as new compositions of matter.

It is now recognized that certain types of sulphur compounds, when added to lubricating oils, are effective to improve properties of the oils, such as the extreme pressure characteristics, the tendency to cause bearing corrosion under extreme conditions, and the viscosity index. Most of the sulphur compounds that have been suggested for this purpose are costly to prepare. Also some of these compounds are derived from raw materials which are not only relatively expensive, but also are likely to become scarce in periods of economic stress and restricted trade. By the present process sulphurized products are produced from readily available and inexpensive raw materials. The products are soluble in lubricating oils, and, when added to such oils, act to improve one or more of the foregoing or other properties of the oils. For example, products of the invention when added to lubricating oils designed for use in Diesel engines are effective to reduce or prevent ring sticking. Also, cutting oils may be improved by the addition thereto of products prepared by the present process.

In accordance with the present invention, a liquid petroleum hydrocarbon mixture containing unsaturated compounds is reacted with sulphur at a temperature of at least 300° F. in the presence of water and under a pressure of hydrogen sulphide. It has been found that by proceeding in this way products are obtained which contain a high proportion of sulphur and possess good color and oil solubility characteristics. Since liquid petroleum hydrocarbon mixtures of the class suitable for use as starting materials in the process are readily available and are generally inexpensive as compared with other unsaturated organic compounds or compositions, the process involves important economic advantages.

For many uses it is desirable to produce a sulphurized product containing an especially high proportion of sulphur. While, by proceeding as above described, products are obtained containing sufficient sulphur to impart to them properties desirable for many uses, as a feature of the invention it has been found that sulphurized derivatives of liquid petroleum hydrocarbon mixtures of the above class with a substantially increased sulphur content can be obtained by subjecting the initial sulphurized product to distillation, preferably vacuum steam reducing. By this means, the low boiling point unsulphurized components are removed leaving a product of high sulphur content. The vacuum steam reducing apparently has no adverse effect upon the sulphur-containing compounds in the initial product.

The starting materials available for use in the process comprise a wide variety of petroleum hydrocarbon mixtures which contain an important proportion of unsaturated compounds and are liquids at ordinary temperatures and pressures. In this connection it is pointed out that in speaking of unsaturated compounds herein it is meant compounds that contain unsaturated aliphatic linkages. While the starting materials may in some cases contain a proportion of aromatic compounds, these compounds are not regarded as being unsaturated. As examples of suitable starting materials there may be mentioned hydrocarbon mixtures prepared by the thermal or catalytic cracking of heavy charge stocks, such as cracked residuum fractions; mixtures prepared by thermal or catalytic reforming; by-products of solvent refining, such as furfural extracts; mixtures obtained by catalytic dehydrogenation; and mixtures prepared by halogenation of hydrocarbon oils followed by dehydrohalogenation. Particularly valuable starting materials are the polymers prepared by catalytic methods. Examples of catalytic polymers are the polymers prepared by the vapor clay treatment of cracked naphtha distillate; the polymers obtained by the use of a phosphoric acid catalyst upon either a mixture of a $C_3$ and a $C_4$ olefin cut or a $C_4$ olefin cut alone, the reaction being carried out in the vapor or liquid phase; and polymers prepared by the action of sulphuric acid on isobutylene or a mixture of isobutylene and normal butylene. These polymers are preferred because they contain a high proportion of open chain olefins of desirable carbon content. In this connection it will be understood that ordinarily a fraction of a polymer will be employed. Since, for most purposes, a relatively high boiling fraction is satisfactory or even preferred, it is possible to use in the present process a fraction of a polymer boiling in the upper gasoline range or above this range. The polymers prepared by the clay vapor treatment of cracked naphtha distillate are of particular interest. These polymers are by-products obtained in the manufacture of motor fuels and yield valuable products when used as starting materials in the present process.

In carrying out the present process in accordance with a preferred manner of proceeding, sulphur, water, hydrogen sulphide, and a suitable hydrocarbon mixture are introduced into a reaction vessel. Although the order in which these materials are introduced into the vessel may be varied, it is generally convenient to mix the hydrocarbon mixture, water, and sulphur either in the reaction vessel or before introducing them into the vessel, and then, after closing the vessel, to introduce the hydrogen sulphide through a suitable port. The reaction mixture is heated to a temperature of at least 300° F., preferably between 340° and 360° F. Sufficient hydrogen sulphide is employed to create a substantial pressure in the reaction vessel due to this compound. The mixture is maintained at the reaction temperature until substantially all of the free sulphur has entered into combination. Under the conditions specified this point is reached in a relatively short period of time. Thus, by maintaining the reaction mixture at a temperature of at least 300° F. for from one to three hours, the reaction is usually complete.

At the completion of the reaction the sulphurized product may be recovered in any suitable manner. It is usually advisable first to cool the reaction mixture so as to prevent over-reaction. This may be done before releasing the pressure in the reaction vessel. The sulphurized product may be recovered by mixing the reaction mixture with a water-insoluble solvent for the sulphurized product, such as methyl ethyl ketone, and then permitting the resulting mixture to stand and form two layers. The water layer is drawn off and the solvent is removed from the sulphurized product by vaporization, preferably under reduced pressure conditions. It is preferred in most cases, however, to effect the separation by filtering the reaction mixture through Filter Cel or similar material, which serves to break the emulsion formed in the reaction. The aqueous layer may then be separated easily from the rest of the mixture.

In this process it is important to control several conditions if products of particularly valuable properties are to be obtained. As brought out in the following discussion, the partial pressure of hydrogen sulphide in the reaction vessel affects the properties of the products. This pressure preferably is not permitted to drop below 50 pounds per square inch and may be as high as 300 pounds per square inch or higher. It has also been found that the amount of water used has an important effect upon the properties of the sulphurized product. Thus, if the water is used in an amount less than that corresponding to a weight ratio of water to hydrocarbon mixture of one to two, the color of the products is not as good as when the water is employed at least in this amount. Although a greater quantity of water appears to have no adverse effect upon the properties of the products, apparently no improvement results and therefore a greater quantity ordinarily would not be used. In general, it may be stated that the weight ratio between the water and the hydrocarbon mixture should be maintained from 1:2 to 2:1.

Although the invention is not limited to any theory of operation, it may be of advantage to point out that researches leading to the development of the invention have indicated that proceeding as above described prevents excessive polymerization due to linkage of double bonds. It appears that the dark color characteristic of ordinary sulphurized products is due at least in part to excessive polymerization of this type. When sulphur alone is used in sulphurization, hydrogen sulphide is evolved and this elimination of hydrogen sulphide produces unsaturation. The additional unsaturation places the compound being treated in condition to continue to polymerize by linkage or condensation through double bonds. By maintaining substantial hydrogen sulphide pressure, the evolution of hydrogen sulphide is prevented. The function of the water in the process is not clearly understood, but it apparently cooperates with the hydrogen sulphide to prevent excessive polymerization. When water is omitted, darker products result. Also the short period of time in which the present process may be carried out is an important factor in producing valuable sulphurized materials.

As will be apparent from a consideration of the following examples, as the temperature of the reaction mixture is raised the total pressure in the reaction vessel increases to a peak and then begins to decrease. Towards the end of the reaction, the pressure due to hydrogen sulphide is less than at a prior period during the heating, indicating that the hydrogen sulphide not only dissolves in the reaction mixture under the pressure conditions, but also undergoes some reaction with the material being sulphurized. That a reaction occurs is also borne out by the fact that in many cases the sulphurized products contain more sulphur than the amount of free sulphur used would lead one to expect.

In order that the invention may be understood more fully, reference should be had to the following examples in which are described typical ways of practicing the present process. It will be understood that these examples are given for illustrative purposes merely and are not intended as limitations of the invention.

*Example I*

In this example the starting material is a polymer obtained by the clay vapor treatment of cracked naptha distillate. It has the following properties:

| | |
|---|---|
| A. P. I. gravity | 26 |
| Saybolt Universal viscosity at 100° F | 230 |
| Flash °F | 230 |
| Color (Tag Robinson) | 11 |
| Bromine number | 140 |

650 grams of this polymer, 325 grams of water, 65 grams of sulphur, and 65 cc. of liquid hydrogen sulphide are charged to a reaction vessel capable of withstanding relatively high pressures and provided with external heating means. The vessel, after being closed, is heated to bring the reaction mixture rapidly to a temperature above 300° F. As the temperature is raised, the pressure rises until at 347° F. the pressure in the vessel is 410 pounds per square inch. The final temperature is 340° F. and the pressure 385 pounds per square inch. The reaction is completed in 2¾ hours. At the end of the reaction, the reaction mixture is removed from the vessel, filtered through Filter Cel to break the emulsion which forms in the reaction, and the water layer, which forms on standing, is drawn off. The sulphurized material obtained is vacuum steam reduced at a maximum bottoms temperature of 300° F. to remove low boiling unsulphurized components and thereby produce a sulphurized product of satisfactory color, high sulphur content, and good solubility in oils.

Example II

This example is concerned with the sulphurization of a fraction, boiling between 350° and 400° F., of a polymer obtained by polymerizing a $C_4$ fraction containing olefins from cracking operations in the presence of a phosphoric acid on kieselguhr catalyst at a temperature of 400° to 480° F., a pressure of 600 to 650 pounds per square inch, and a contact time of 80 seconds. The A. P. I. gravity of the polymer is 64.7 and it boils over the range from 72° to 498° F. The process of this example is similar to that described in Example I, except that the reaction vessel is charged with 500 grams of the polymer, 250 grams of water, 60 grams of sulphur, and 50 cc. of liquid hydrogen sulphide. The initial pressure in the reaction vessel at 77° F. is 95 pounds per square inch and the pressure at 350° F. is 360 pounds per square inch. The reaction is completed in 110 minutes. The sulphurized material before vacuum steam reducing contains 9.5 per cent sulphur. Vacuum steam reducing yields a product which is a reddish colored oil and contains 25 per cent sulphur. This product is soluble in lubricating and cutting oils.

It will be recognized by those skilled in the art that the conditions described in the examples may be varied; for example, in place of the starting materials employed in the examples, there may be used others of the class of liquid petroleum hydrocarbon mixtures containing unsaturated compounds, particularly mixtures specifically mentioned above. Generally, the amount of sulphur employed is the same as that used in sulphurizations carried out with the use of sulphur alone. To some extent, the properties of the products may be varied in degree by using varying amounts of sulphur.

The time necessary to complete the sulphurization reaction may be determined in any particular case by analyzing withdrawn samples of the reaction mixture to detect the presence of free sulphur. When free sulphur is substantially absent in the reaction mixture, the reaction is complete. Although the temperature may be varied, it may be stated in general that a reaction temperature of 300° to 375° F. is satisfactory.

Since changes may be made in the processes and products above described, without departing from the scope of the invention, it will be understood that the above description is given for illustrative purposes merely and is not intended as a limitation of the invention.

We claim:

1. In a process for sulphurizing liquid petroleum hydrocarbon mixtures containing unsaturated compounds with sulphur in a closed reaction vessel at temperatures in excess of 300° F., the improvement which comprises incorporating hydrogen sulphide with the reactants at a temperature below that at which reaction between the sulphur and the unsaturated compounds occurs and in such amounts as to exert a pressure of hydrogen sulphide of at least 50 pounds per square inch prior to the initiation of a reaction between the sulphur and the hydrocarbon mixture and sufficient to maintain a pressure of at least 50 pounds per square inch throughout the reaction.

2. In a process for sulphurizing liquid petroleum hydrocarbon mixtures containing unsaturated compounds with sulphur in a closed reaction vessel at temperatures in excess of 300° F., the improvement which comprises incorporating hydrogen sulphide and water with the reactants at a temperature below that at which reaction between the sulphur and the unsaturated compounds occurs and in such amounts as to exert a pressure of hydrogen sulphide of at least 50 pounds per square inch prior to the initiation of a reaction between the sulphur and the hydrocarbon mixture and sufficient to maintain a combined pressure of the hydrogen sulphide and water of at least 50 pounds per square inch throughout the reaction.

3. In a process for sulphurizing liquid petroleum hydrocarbon mixtures containing unsaturated compounds with sulphur in a closed reaction vessel at temperatures in excess of 300° F., the improvement which comprises incorporating hydrogen sulphide and water with the reactants at a temperature below that at which reaction between the sulphur and the unsaturated compounds occurs, the weight ratio between the water and the hydrocarbon mixture being at least 1:2, the amount of hydrogen sulphide being sufficient to exert a pressure of at least 50 pounds per square inch prior to the initiation of a reaction between the sulphur and the hydrocarbon mixture, and the amounts of both water and hydrogen sulphide being sufficient to maintain a combined pressure within the reaction vessel of at least 50 pounds per square inch throughout the reaction period.

EDWIN C. KNOWLES.
FREDERIC C. McCOY.